United States Patent
Nave et al.

(10) Patent No.: US 8,636,117 B2
(45) Date of Patent: *Jan. 28, 2014

(54) WEDGE SHAPE SAFETY STOP

(75) Inventors: Shawn Michael Nave, Tucson, AZ (US);
Lee Curtis Randall, Tucson, AZ (US);
Raymond Yardy, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 333 days.

This patent is subject to a terminal disclaimer.

(21) Appl. No.: 12/895,570

(22) Filed: Sep. 30, 2010

(65) Prior Publication Data

US 2012/0080274 A1    Apr. 5, 2012

(51) Int. Cl.
*B61K 7/02* (2006.01)
(52) U.S. Cl.
USPC ............... 188/62; 188/2 R; 188/32; 188/65.1; 188/78; 188/144; 188/171; 188/177; 188/180; 188/200; 187/201; 187/202; 187/246; 187/262; 187/282; 187/332; 187/363; 292/164; 292/175; 901/1; 901/49
(58) Field of Classification Search
USPC ........... 188/36, 188, 189, 67, 165, 61, 63, 62, 188/65.1; 901/1, 49, 11, 12; 104/249–251, 104/257–258; 414/561, 591; 193/5, 35 A, 193/35 B, 35 R, 42
See application file for complete search history.

(56) References Cited

U.S. PATENT DOCUMENTS

| | | | | | |
|---|---|---|---|---|---|
| 1,940,971 | A | * | 12/1933 | Schwartz et al. | 292/164 |
| 2,841,250 | A | * | 7/1958 | Osborn | 188/2 R |
| 2,950,948 | A | * | 8/1960 | Hardigan et al. | 187/202 |
| 3,502,332 | A | * | 3/1970 | Wolf | 463/69 |
| 4,934,278 | A | | 6/1990 | Tanita et al. | 104/119 |
| 5,366,045 | A | | 11/1994 | Liston | 187/376 |
| 5,884,744 | A | * | 3/1999 | Slodkowski | 193/35 A |
| 7,284,641 | B1 | * | 10/2007 | Spence, III | 188/32 |
| 7,575,099 | B2 | | 8/2009 | Oh et al. | 187/286 |
| 7,757,813 | B2 | * | 7/2010 | Kerr | 182/39 |
| 2007/0089963 | A1 | | 4/2007 | Kinoshita et al. | 192/125 |

* cited by examiner

*Primary Examiner* — Robert A Siconolfi
*Assistant Examiner* — San Aung
(74) *Attorney, Agent, or Firm* — John H. Holcombe

(57) ABSTRACT

A safety stop is provided for stopping a movable member having at least one set of opposed wheels for gripping a rail. The stop has a track on each of opposite sides forming a wedge shape of a narrow end progressively widening to a wide end in a direction of travel of the movable member. With the opposed wheels of the movable member respectively at opposite sides of the wedge shape member, the tracks of the wedge shape member engage and impart a spreading strain to the opposed wheels as the movable member moves in the direction of travel. The opposed wheels of the movable member comprise a deformable material to absorb the kinetic energy of the movable member. The tracks of the stop additionally may have undulating features comprising concave and convex surfaces in the direction of motion.

16 Claims, 6 Drawing Sheets

WEDGE SHAPE SAFETY STOP

FIELD OF THE INVENTION

This invention relates to end stops, and more particularly to safety stops for stopping a movable member.

BACKGROUND OF THE INVENTION

An ever present desire is to achieve faster speeds for movable members, one example comprising robots of data storage libraries. Hence, the movable members tend to be made lighter and possibly likely to sustain damage if reaching an end of travel at full speed. In the case of robots, the modern robots may be made of more light weight plastic parts or with other light weight materials. While these light weight fast moving robots are ideal for performance of moving quickly within a library system, there exists a possibility of a code bug or hardware error that could make the robot run out of control at full speed into the end of its travel of its rails. A need therefore exists to stop an out of control movable member without destroying the operating mechanism of the light weight member.

SUMMARY OF THE INVENTION

Safety stops and safety stop arrangements are provided for stopping a movable member, such as a movable robot.

In one embodiment, a safety stop is provided for stopping a movable member having at least one set of opposed wheels configured to engage opposite sides of at least one rail. The stop member has a track on each of opposite sides forming a wedge shape of a narrow end progressively widening to a wide end in a direction of travel of the movable member with respect to the stop member. With the opposed wheels of the movable member respectively at opposite sides of the wedge shape member, the tracks of the wedge shape member are configured to engage and impart a spreading strain to the opposed wheels as the movable member moves in the direction of travel.

In a further embodiment, the opposed wheels of the movable member comprise at least partially a deformable material.

In a still further embodiment, the opposed wheels of the movable member are mounted on a mount allowing the opposed wheels to be forced by the spreading strain to be spread apart.

In another embodiment, the movable member comprises at least two sets of the opposed wheels, the sets displaced from each other in the direction of travel.

In still another embodiment, the tracks of the stop member additionally comprise bump features therealong.

In a further embodiment, the bump features comprise concave surfaces in the direction of motion, the concave surfaces having radii greater than that of the opposed wheels.

In yet another embodiment, the stop member additionally comprises guide walls at each side of each track.

In still another embodiment, the stop member additionally comprises a central slot configured to position at least one rail, the rail supporting the opposed wheels of the movable member.

In a further embodiment, each the track of the stop member comprises a leading edge rounded ramp extending forward of the track in a direction opposite the direction of motion to a point adjacent the central slot, the rounded ramp configured to guide an opposed wheel onto the track.

In another embodiment, the stop member additionally comprises a hard stop at the wide end of the tracks of the wedge shape member.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
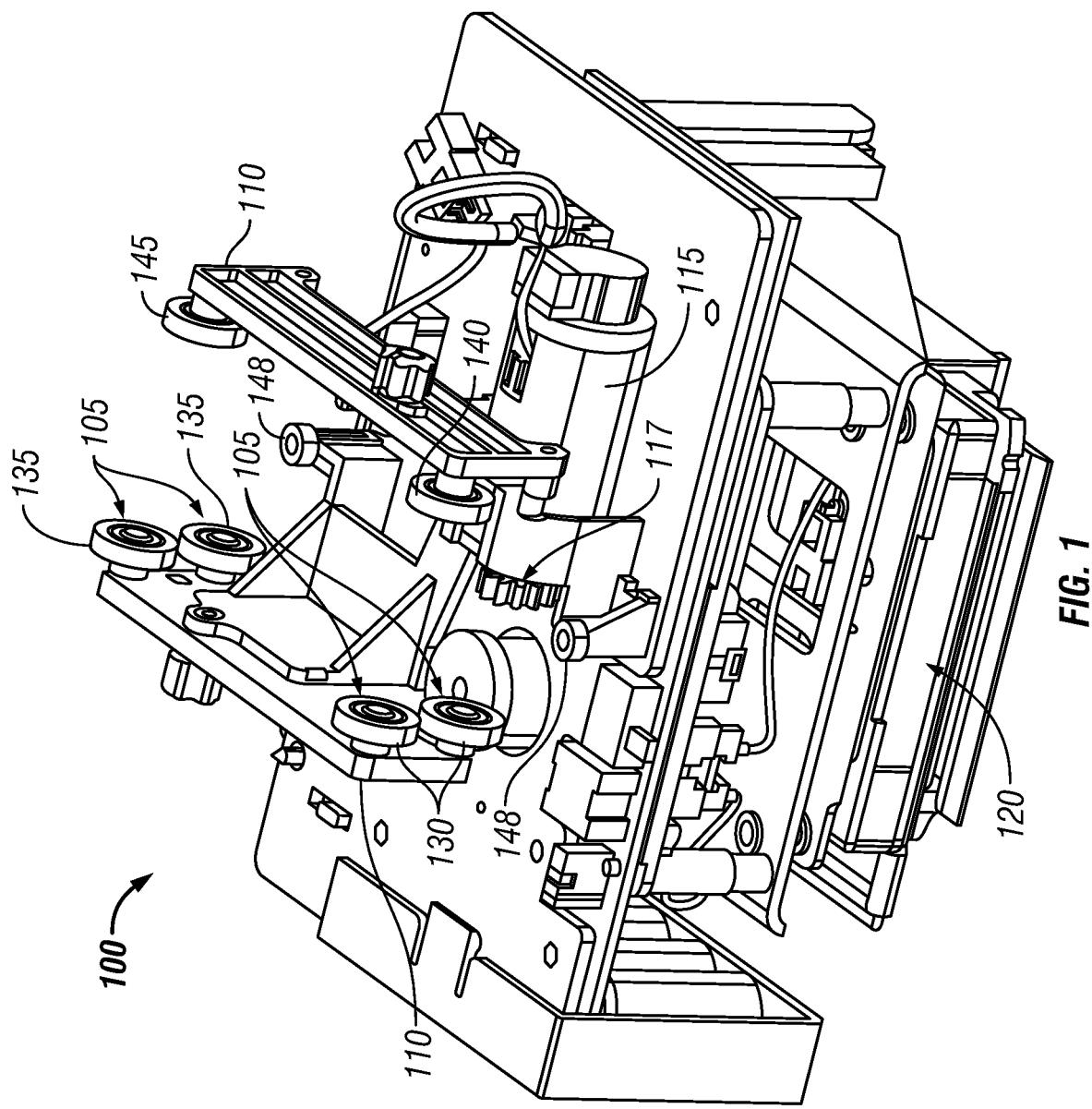
FIG. 1 is an illustration of a movable member with opposed wheels which may implement aspects of the present invention.
Figure 2:
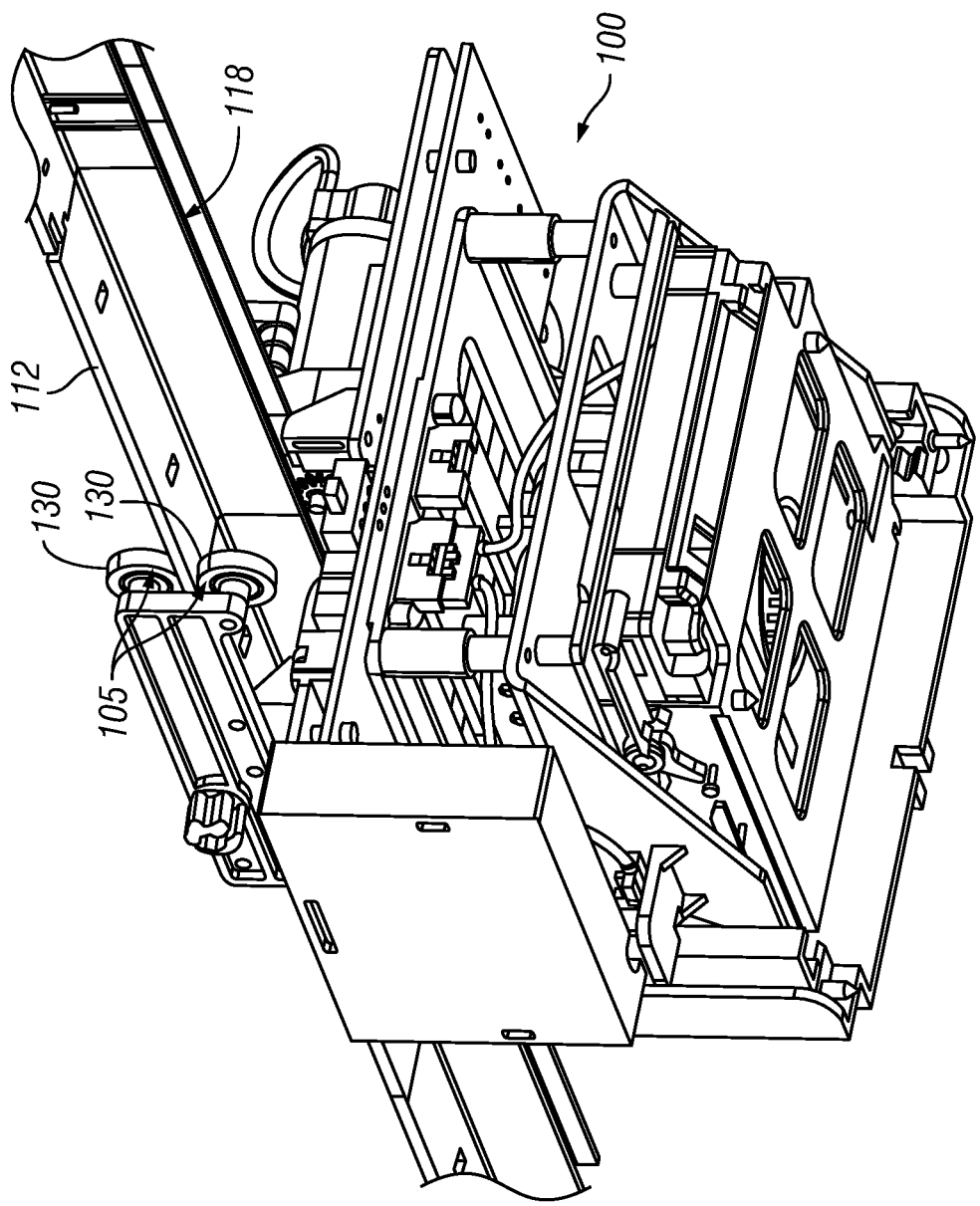
FIG. 2 is an illustration of the movable member of FIG. 1 with the opposed wheels on opposing sides of a guide rail.

Referring to FIGS. 1 and 2, an example of a movable member 100 is illustrated, which in the example, comprises a robot mechanism usable in a data storage library system. The movable member comprises opposed guide wheels 105 mounted on guide wheel brackets 110 so as to be positioned on opposing sides of guide rail 112.

A drive motor 115 of the movable member drives a pinion 117 to mesh with rack 118 to drive the movable member 100 along the guide rail 112. In one example, the robot mechanism comprising the movable member is arranged to transport a tape cartridge 120.

In one embodiment, 4 sets of opposed wheels 105 are provided for the movable member, in the example, at each side of the movable member. Additionally, one set 130 of opposed wheels 105 is located towards one end of the moveable member 100, and another set 135 is located displaced from the other set of opposed wheels in the direction of motion of the moveable member. Both sets 130 and 135 are at the same side of the movable member and are configured to engage opposite sides of the rail 112. In the example, 2 similar sets of opposed wheels are provided at the other side of the movable member, set 140 and set 145 are located displaced from each other in the direction of motion of the moveable member.

In the example of a robot mechanism as the movable member 100, guide rollers 148 position the movable member laterally with respect to the rail 112.

Figure 3:
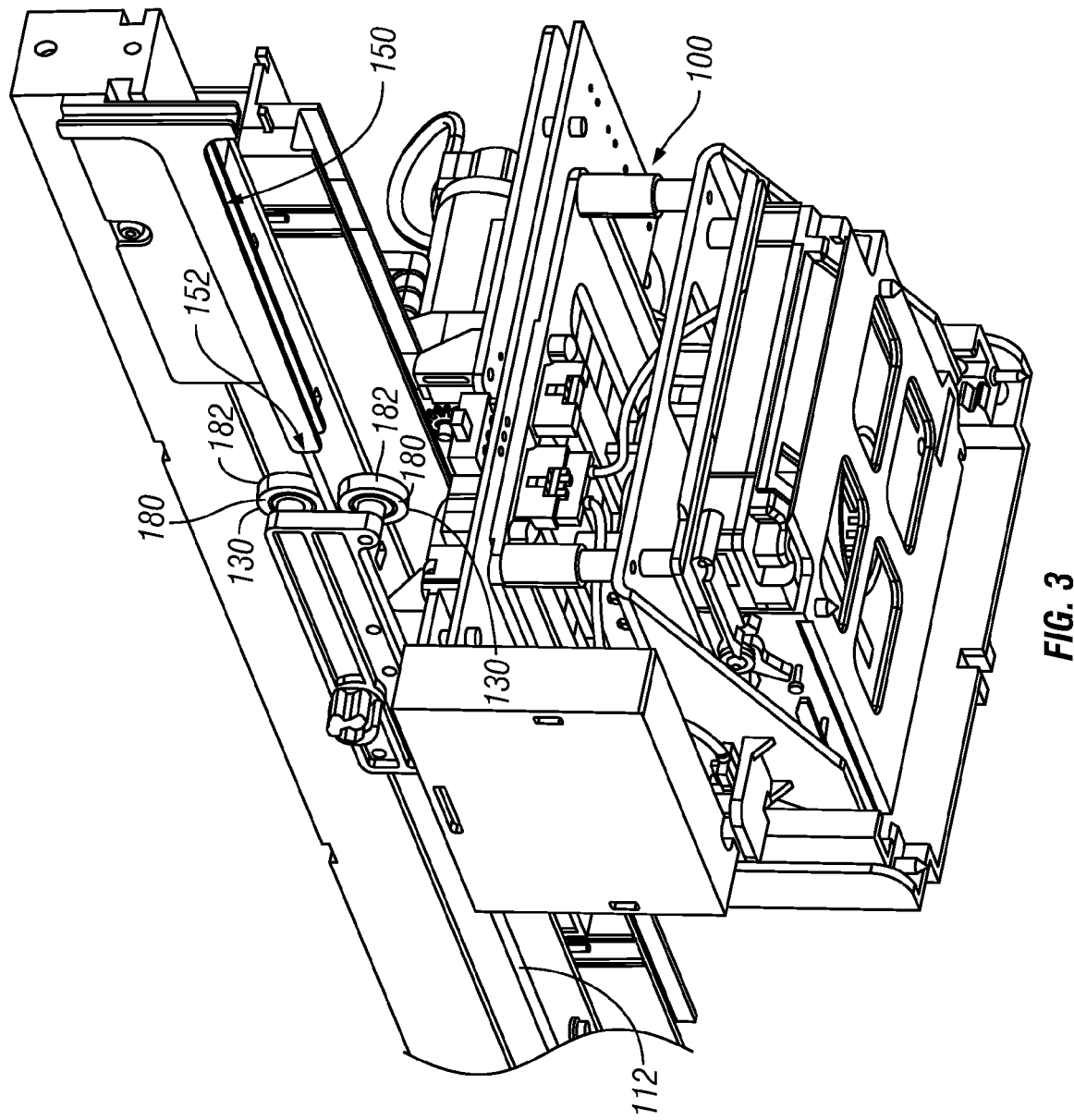
FIG. 3 is an illustration of the movable member and guide rail of FIG. 2 with a safety stop in accordance with the present invention.
Figure 4:
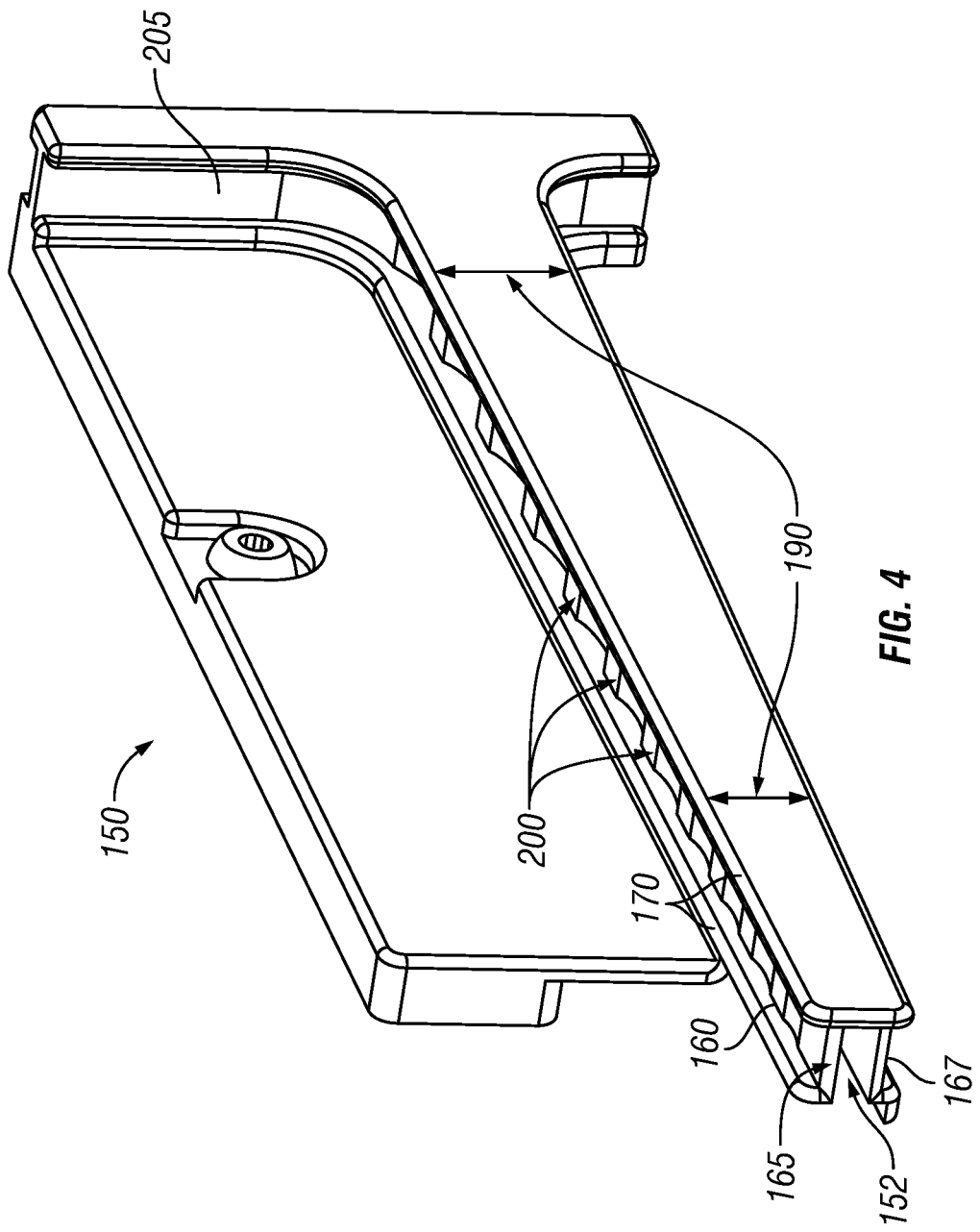
FIGS. 4 and 5 are illustrations of the safety stop of FIG. 3.
Figure 5:
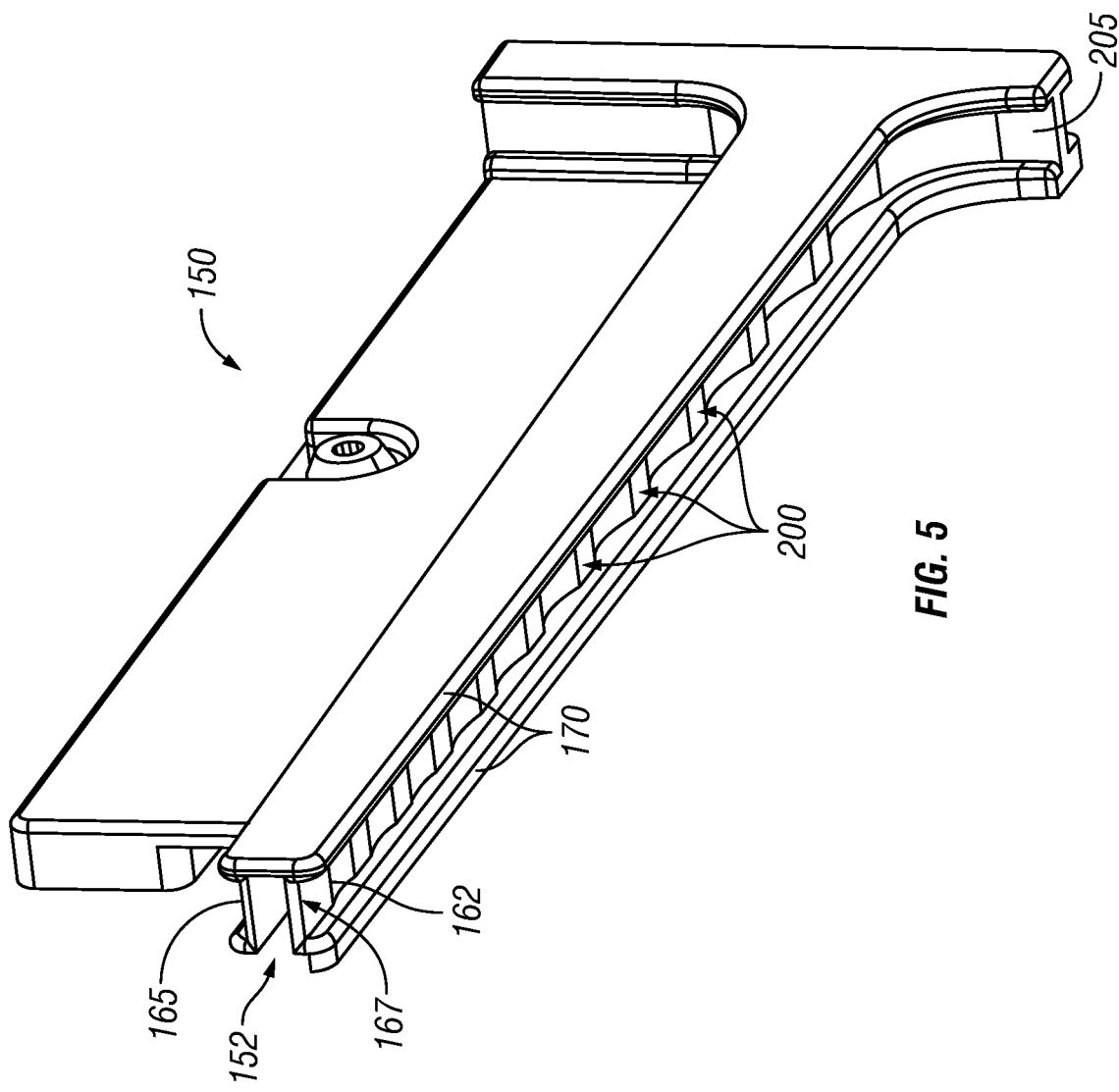

Referring additionally to FIGS. 3, 4 and 5, a wedge shape safety stop 150 is provided at the end of rail 112 and has a slot 152 configured to position the safety stop on the rail.

The safety stop comprises a wedge shape stop member 150 that has tracks 160, 162 on each of opposite sides forming a wedge shape of a narrow end progressively widening to a wide end in a direction of travel of the movable member 100 with respect to the stop member 150. With the opposed wheels of the movable member respectively at opposite sides of the wedge shape member, the tracks of the wedge shape member are configured to engage and impart a spreading strain to the opposed wheels 105 as the movable member moves in the direction of travel.

The leading end of the stop member 150 at each side of slot 152 at each track 160, 162 comprises a leading edge rounded ramp 165, 167 extending forward of the track in a direction opposite the direction of motion to a point adjacent the central slot 152. The rounded ramp is configured to guide an opposed wheel onto the track.

Guide walls 170 are provided at each side of each track. The guide walls guide the opposed wheels on each track 160, 162, to retain the opposed wheels on each track.

The opposed wheels 105 of the movable member comprise at least partially a deformable material. In the illustrated example, the opposed wheels, see wheels 130, each comprises a bearing 180 with a thick outer wheel of rubber, polyurethane, high density foam, or other deformable material 182.

The deformation of each of the opposed wheels absorbs the kinetic energy of the movable member.

The walls 170 of safety stop 150, in one embodiment, may be narrowed towards the spaced apart end of the tracks 160, 162 so as to engage the bulging sides of deformable opposed wheels and impart a frictional force to the wheels, absorbing additional kinetic energy.

The wheels are mounted to posts on a bracket 110 that, for example, is plastic, and that has some flexibility to allow the guide wheels to spread apart when engaging the wedge shape stop member 150.

The wedge shape of the stop member tracks 160, 162, progressively increases the separation distance between the opposed wheels 105 as shown by arrows 190, and engages and imparts a spreading strain to the opposed wheels 105 as the movable member moves in the direction of travel. The spreading strain deforms the deformable portion 182 of the opposed wheels, absorbing the kinetic energy of the movable member 100, causing it to slow down and come to a stop. Further, the mount 110 for the opposing wheels allows the opposed wheels to be forced by the spreading strain to be spread apart, and absorbs additional kinetic energy.

Still further, in one embodiment, the movable member 100 comprises at least two sets of the opposed wheels 105, for example, the sets 130 and 135 displaced from each other in the direction of travel. Thus, while one set of wheels 130 is engaged by the tracks of the wedge shape stop member, the engagement of the second set of wheels 135 increases the absorption of kinetic energy.

In addition, the wedge shape stop member comprises bump features 200 therealong. In one embodiment, the bump features 200 comprise concave surfaces in the direction of motion, the concave surfaces having radii greater than that of the opposed wheels. The bump features cause the opposed wheels to move up and down more frequently when moving across the wedge shape of the tracks to absorb even more energy, and increase the resisting force in the direction of the motion of the movable member to assist in bringing the movable member to a safe stop.

Another feature is a hard stop 205 at the wide end of the tracks of the wedge shape member. The hard stop prevents the movable member from falling off the end of the safety stop.

As one alternative, the opposed wheels may be solid, and the tracks 160, 162 of the stop member comprise deformable material of rubber, polyurethane, high density foam, or other deformable material.

As another alternative, or in addition, the tracks 160, 162 may be coated with a tacky material to absorb kinetic energy.

Figure 6:
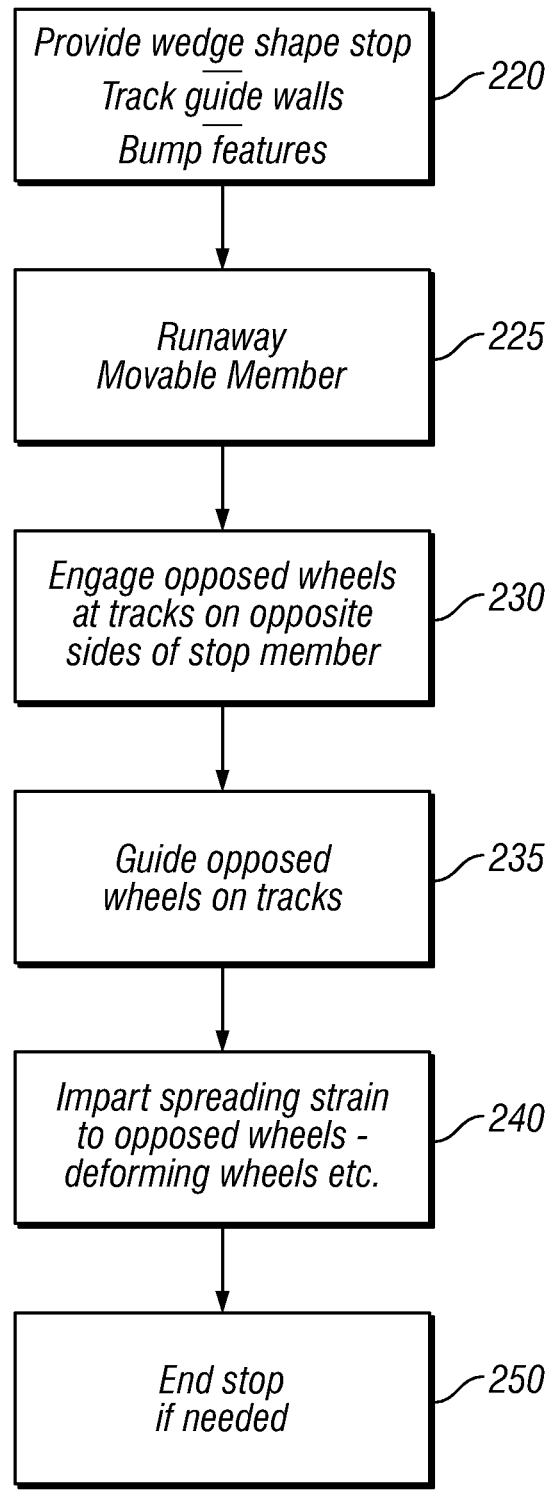
FIG. 6 is a flow chart depicting an exemplary method of the operation of the safety stop and movable member of FIGS. 3, 4 and 5.

Referring additionally to FIG. 6, step 220 comprises providing the wedge shape stop 150. The stop member has a track 160, 162 on each of opposite sides forming a wedge shape of a narrow end progressively widening to a wide end in a direction of travel of the movable member with respect to the stop member as shown by arrows 190. Guide walls 170 are provided at each side of each track and the tracks may comprise bump features 200 as discussed above.

In step 225, if the movable member is operating normally, it may operate some distance from the stop 150, and if it goes to the end, it can detect the stop 150 by bumping into the rounded leading edges 165, 167 of the stop. If the mechanism instead is in a runaway condition, as illustrated by step 225, in step 230, the opposed wheels are engaged at the tracks 160, 162 on each of opposite sides of the stop member, as the wheels are driven over the leading edges 165, 167.

In step 235, the guide walls 170 trap the opposed wheels and guide them onto the tracks 160, 162 so as to not slip off the tracks. In step 240, as the movable member moves up the wedge shape of the tracks, the imparted strain of the wedge shape causes the deformable portion of the opposed wheels 130 to deform, and the posts holding the wheels may begin to spread apart as the bracket 110 also deforms. These actions absorb the kinetic energy of the movable member. Additionally, the bump features 200 comprise concave surfaces in the direction of motion, the concave surfaces having radii greater than that of the opposed wheels. The bump features cause the opposed wheels 130 to move up and down more frequently when moving across the wedge shape of the tracks to absorb even more energy, and increase the resisting force in the direction of the motion of the movable member to assist in bringing the movable member 100 to a safe stop. Alternatively, the bump features 200 may have smaller radii, or be convex, or be of any shape that is arranged to deflect the opposed wheels 130 to absorb energy.

The subsequent movements of a second set of wheels 135, whose deformable portions also deform, increase the absorption of kinetic energy.

Additionally, any tacky coating of the tracks 160, 162 absorbs kinetic energy as the opposed wheels move along the track.

Still further, any narrowing of the walls 170 squeezes the sides of the opposed wheels and imparts a frictional force to the wheels, absorbing additional energy.

In alternative or additional embodiments, in step 240, as the movable member moves up the wedge shape of the tracks, the imparted strain of the wedge shape causes the tracks 160, 162 to deform as the opposed wheels move into the tracks, thereby absorbing kinetic energy of the movable member.

If the kinetic energy is too great to have the stop 150 completely stop the motion of the movable member 100, in step 250, the hard stop 205 at the wide end of the tracks of the wedge shape member prevents the movable member from falling off the end of the safety stop.

In alternative embodiments, the bracket 110 may be solid and not deform, and the rail 112 may comprise spaced apart rails, each supporting an opposed wheel.

In further alternative embodiments, the wedge shape may extend only a short distance and the tracks 160, 162 may be parallel thereafter and comprise bump features 200.

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A safety stop comprising:
a stop member having a track on each of opposite sides forming a wedge shape of a narrow end progressively widening to a wide end in a direction of travel of opposed wheels of a movable member with respect to said stop member, said opposed wheels comprising at least partially a deformable material, said tracks of said wedge shape member configured to engage circumferential surfaces of said opposed wheels, said opposed wheels respectively at opposite sides of said wedge-shaped member, and impart a spreading strain to said opposed wheels of said movable member as said movable member moves in said direction of travel such that deformation of each of said opposed wheels absorbs kinetic energy of said movable member.

2. The safety stop of claim 1, wherein said tracks of said wedge shape member additionally comprise bump features therealong.

3. The safety stop of claim 2, wherein said bump features comprise concave surfaces in said direction of motion, said concave surfaces having radii greater than that of said opposed wheels.

4. The safety stop of claim 1, additionally comprising guide walls at each side of each said track, said walls narrowed towards the spaced apart end of said tracks so as to engage the bulging sides of deformable opposed wheels and impart a frictional force to said wheels, absorbing additional kinetic energy.

5. The safety stop of claim 1, additionally comprising a central slot configured to position said safety stop on at least one rail, said rail supporting said opposed wheels of said movable member.

6. The safety stop of claim 5, wherein each said track of said wedge shape member comprises a leading edge rounded ramp extending forward of said track in a direction opposite said direction of motion to a point adjacent said central slot, said rounded ramp configured to guide an opposed wheel onto said track.

7. The safety stop of claim 1, additionally comprising a hard stop at said wide end of said tracks of said wedge shape member.

8. A safety stop arrangement comprising:
a movable member comprising at least one set of opposed wheels configured to engage opposite sides of at least one rail with circumferential surfaces of said wheels, said opposed wheels comprising at least partially a deformable material; and
a stop member having a track on each of opposite sides forming a wedge shape of a narrow end progressively widening to a wide end in a direction of travel of said movable member with respect to said stop member, said tracks of said wedge shape member configured to engage said circumferential surfaces of said opposed wheels, said opposed wheels respectively at opposite sides of said wedge-shaped member, and impart a spreading strain to said opposed wheels of said movable member as said movable member moves in said direction of travel such that deformation of each of said opposed wheels absorbs kinetic energy of said movable member.

9. The safety stop arrangement of claim 8, wherein said opposed wheels of said movable member are mounted on a mount allowing said opposed wheels to be forced by said spreading strain to be to be spread apart.

10. The safety stop arrangement of claim 8, wherein said movable member comprises at least two sets of said opposed wheels, said sets displaced from each other in said direction of travel.

11. The safety stop arrangement of claim 8, wherein said tracks of said stop member additionally comprise bump features therealong.

12. The safety stop arrangement of claim 11, wherein said bump features comprise concave surfaces in said direction of motion, said concave surfaces having radii greater than that of said opposed wheels.

13. The safety stop arrangement of claim 8, wherein said stop member additionally comprises guide walls at each side of each said track, said walls narrowed towards the spaced apart end of said tracks so as to engage the bulging sides of deformable opposed wheels and impart a frictional force to said wheels, absorbing additional kinetic energy.

14. The safety stop arrangement of claim 8, wherein said stop member additionally comprises a central slot configured to position said safety stop on at least one rail, said rail supporting said opposed wheels of said movable member on opposing sides thereof.

15. The safety stop arrangement of claim 14, wherein each said track of said stop member comprises a leading edge rounded ramp extending forward of said track in a direction opposite said direction of motion to a point adjacent said central slot, said rounded ramp configured to guide an opposed wheel onto said track.

16. The safety stop arrangement of claim 8, wherein said stop member additionally comprises a hard stop at said wide end of said tracks of said wedge shape member.

* * * * *